United States Patent [19]
Miyata

[11] Patent Number: 5,185,820
[45] Date of Patent: Feb. 9, 1993

US005185820A

[54] SYSTEM FOR COMPRESSING IMAGE DATA HAVING BLANK LINES

[75] Inventor: Masahiko Miyata, Kanagawa, Japan

[73] Assignee: Fuji Xerox Co., Ltd., Tokyo, Japan

[21] Appl. No.: 595,222

[22] Filed: Oct. 10, 1990

[51] Int. Cl.$^5$ ............................................. G06K 9/36
[52] U.S. Cl. ................................... 382/56; 358/261.2
[58] Field of Search ................ 382/56; 358/261.2, 430

[56]   References Cited
U.S. PATENT DOCUMENTS

| | | | |
|---|---|---|---|
| 4,156,880 | 5/1979 | Yamada | 358/261.2 |
| 4,185,302 | 1/1980 | Mounts et al. | 358/261.2 |
| 4,363,036 | 12/1982 | Subramaniam | 358/261.2 |
| 4,899,394 | 2/1990 | Lee | 382/56 |

*Primary Examiner*—Jose L. Couso
*Attorney, Agent, or Firm*—Finnegan, Henderson, Farabow, Garrett and Dunner

[57]   ABSTRACT

A data compression method for an image processing system suitable for compressing image data containing a number of all white lines. Concurrently with the writing of a line memory, a circuit detects a set of adjacent all white lines, which are represented by all zeros. When such a set is detected, a special line boundary code and a code indicating the number of lines in the set are inserted into the image data, which is then applied to a compressor. When the compressor detects the special line boundary code, the compressor discards the corresponding image data, and generates an output for the line consisting of only the uncompressed line boundary code.

15 Claims, 7 Drawing Sheets

FIG. 2
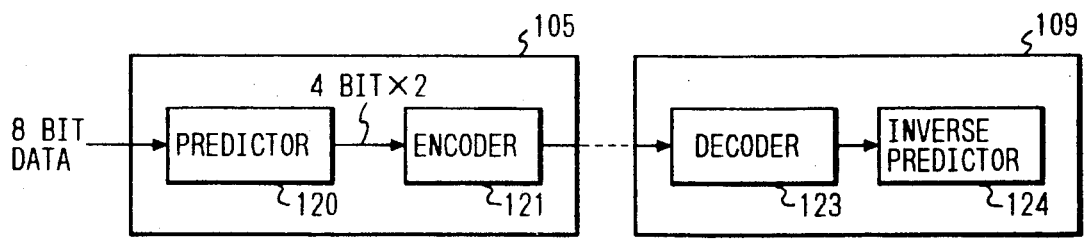
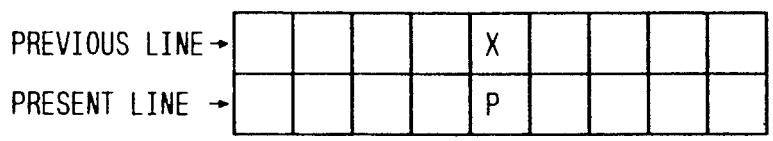
FIG. 3(a)
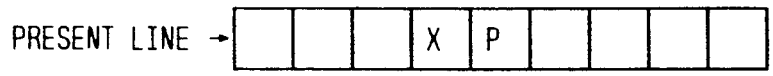
FIG. 3(b)
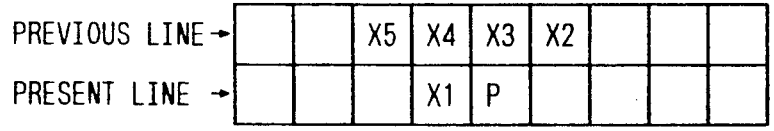
FIG. 3(c)
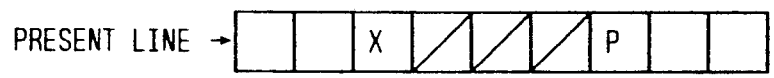
FIG. 3(d)
FIG. 4
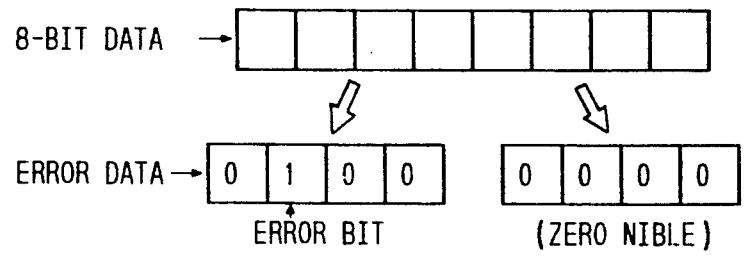

FIG. 5

| TA | 0001, 0010, 0100, 1000 |
|---|---|
| TB | ERROR DATA OF 4 BITS THAT ARE OTHER THAN TA AND THE ZERO NIBLE |

| aa | tttt |
|---|---|
| 00 | 1000 |
| 01 | 0100 |
| 10 | 0010 |
| 11 | 0001 |

| bbbb | tttt |
|---|---|
| 0100 | 0011 |
| 0101 | 0101 |
| 0110 | 0110 |
| 0111 | 0111 |
| 1001 | 1001 |
| 1010 | 1010 |
| 1011 | 1011 |
| 1100 | 1100 |
| 1101 | 1101 |
| 1110 | 1110 |
| 1111 | 1111 |

FIG. 7

| 0 | 10aa |
|---|---|
| 1~25 | 0rrrrraa |
| 26~63 | 11rrrrrrtttt |
| 64~89 | 11ssssssttttt |

FIG. 8

| 0, 1 | 011bbbbr |
|---|---|
| 2~63 | 11rrrrtttt |

FIG. 9

| 11rrrrrr0000 |
|---|

FIG. 10

| 0 0 | R A W |
|---|---|
| 0 1 | N O R |
| 1 0 | P B K |
| 1 1 | R P T |

```
    1        2        3        4        5        6        7
00000000 00000000 00000000 00000000 00010000 11110000 00000000
└──────── 8 NIBLES ────────┘           └1 NIBLE
```

FIG. 11(a)

```
FIRST LINE   00000001  ← PREDICTIVE CODING
  2nd LINE   00100011  ← R=8, T=0001 (aa=11)
  3rd LINE   01111111  ← R=1, T=1111 (bb=1111)
  4th LINE   00000001  ← NEXT LINE START
```

FIG. 11(a)

FIG. 12(a)
FIG. 12(b)
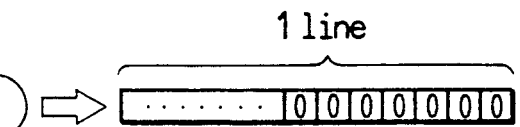
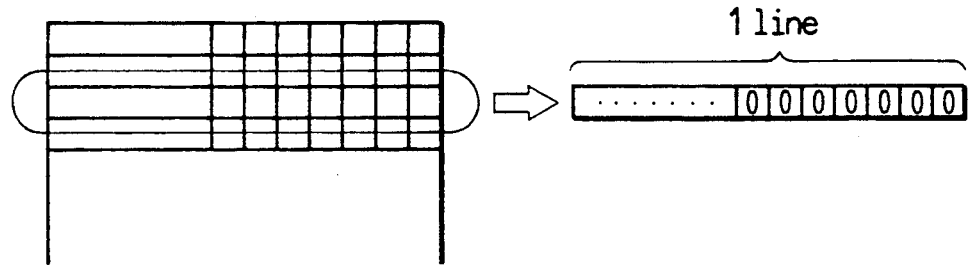
FIG. 13
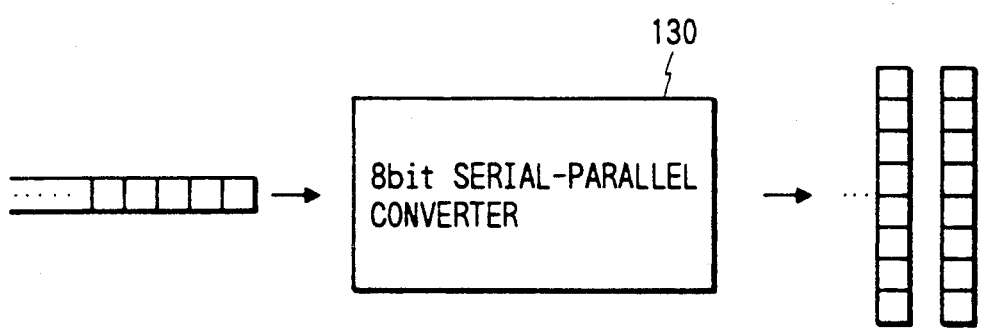

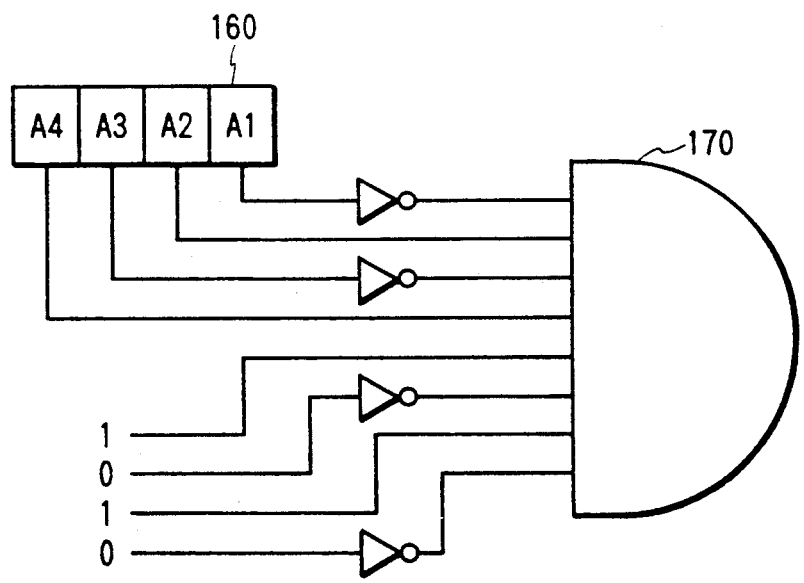

SYSTEM FOR COMPRESSING IMAGE DATA HAVING BLANK LINES

BACKGROUND OF THE INVENTION

1. Field of the Invention

The present invention relates to a data compression system, and more particularly to a data compression system for compressing image data having frequent blank lines.

2. Discussion of the Related Art

In an image processing system it is typically desirable to compress image data. If the image data is being stored, compression of the data conserves the amount of storage space used. If the image data is being transferred over a communication line, compression of the data reduces bandwidth requirements or reduces transmission time.

Many compressors employ a run-length encoder that encodes sections of the input data containing a run of "0's" into a number indicating the number of "0's" successively appearing in the input data. Another type of encoder uses a two dimensional encoding system that encodes based on a correlation in the vertical as well as the horizontal direction.

One or two dimensional encoding is suitable for image data because image data tends to have similar types of data grouped together within a given area of the image. Although two level data, such as text data, can be directly encoded with good compression efficiency, halftone image data typically cannot be directly encoded because halftone data consists of periodic structures without successive bits of "0". Thus, before processing image data with a run-length encoder it is desirable to precondition the data to increase the number of successive "0's" with a "predictor." A predictor predicts the value of the next pixel on the basis of values of pixels already processed.

A run-length encoder typically generates code words containing a field for the run-length. Because the field is typically a fixed number of bits in size, the length of a run capable of being coded by a single unit is limited. Thus, very long runs of "0's" must be encoded using multiple code words. Text data typically contains very long runs of "0's" corresponding to multiple blank lines between lines of text. Thus, although direct run-length encoding of text data achieves some data compression, the coded data typically contains multiple code words corresponding to a single run of "0's".

SUMMARY OF THE INVENTION

It is an object of the present invention to encode very long runs of "0's" corresponding to multiple blank lines of text data with improved compression efficiency.

Additional objects and advantages of the invention will be set forth in part in the description which follows and in part will be obvious from the description, or may be learned by practice of the invention.

To achieve this object, according to one aspect of the present invention a data compression system for an image processing system comprises means for storing a line of serial input image data; means for detecting a blank line of input image data; means, responsive to the storing means and to the blank line detecting means, for inserting a special code into the input image data when the detecting means detects a blank line of input image data; and compressing means, responsive to the means for inserting. The compressing means includes means for detecting the special code; means, coupled to the special code detecting means, for generating a compressed version of the input image data, when the special code detecting means does not detect the special code; and means, coupled to the special code detecting means, for generating the special code, when the special code detecting means detects the special code.

To achieve this object, according to another aspect of the present invention, a data compression method for an image processing system comprises the steps of storing serial input image data; detecting a blank line of input image data; inserting, in response to the blank line detecting step, a special code into the input image data when the detecting step detects a blank line of input image data; and compressing, responsive to the inserting step. The step of compressing includes the substeps of detecting the special code; generating, in response to the special code detecting step, a compressed version of the input image data, when the special code detecting step does not detect the special code; and generating, in response to the special code detecting step, the special code, when the special code detecting step detects the special code.

The accompanying drawings, which are incorporated in and which constitute a part of this specification, illustrate preferred embodiments of the invention and, together with the description, explain the principles of the invention.

BRIEF DESCRIPTION OF THE DRAWINGS

FIG. 2 is a block diagram showing a compressor unit and a decompressor unit that are used in the image processing system shown in FIG. 1.

FIGS. 3(a) through 3(d) are diagrams for explaining various types of predictors.

FIG. 4 is a diagram for explaining error data generated by a predictor.

FIG. 5 is a diagram showing terminator codes for delineating runs of "0's".

FIGS. 6(a) through 6(b) are diagrams for explaining the selection of a terminator code.

FIGS. 7 to 9 are diagrams for explaining the coding of runs of various lengths.

FIG. 10 is a table showing line boundary codes and their meanings.

FIGS. 11(a) and 11(b) are diagrams illustrating the encoding of a bit series generated by the prediction unit.

FIGS. 12(a) and 12(b) are diagrams showing serial data.

FIG. 13 is a diagram showing a serial to parallel conversion of the data.

FIGS. 17(a) and 17(b) are diagrams showing the application how to apply a line boundary code to the data.

FIG. 18 is a block diagram showing a line boundary code detector.

DESCRIPTION OF THE PREFERRED EMBODIMENTS

An embodiment of a data compressing method for an image processing system will be described with reference to the accompanying drawings.

Figure 1:
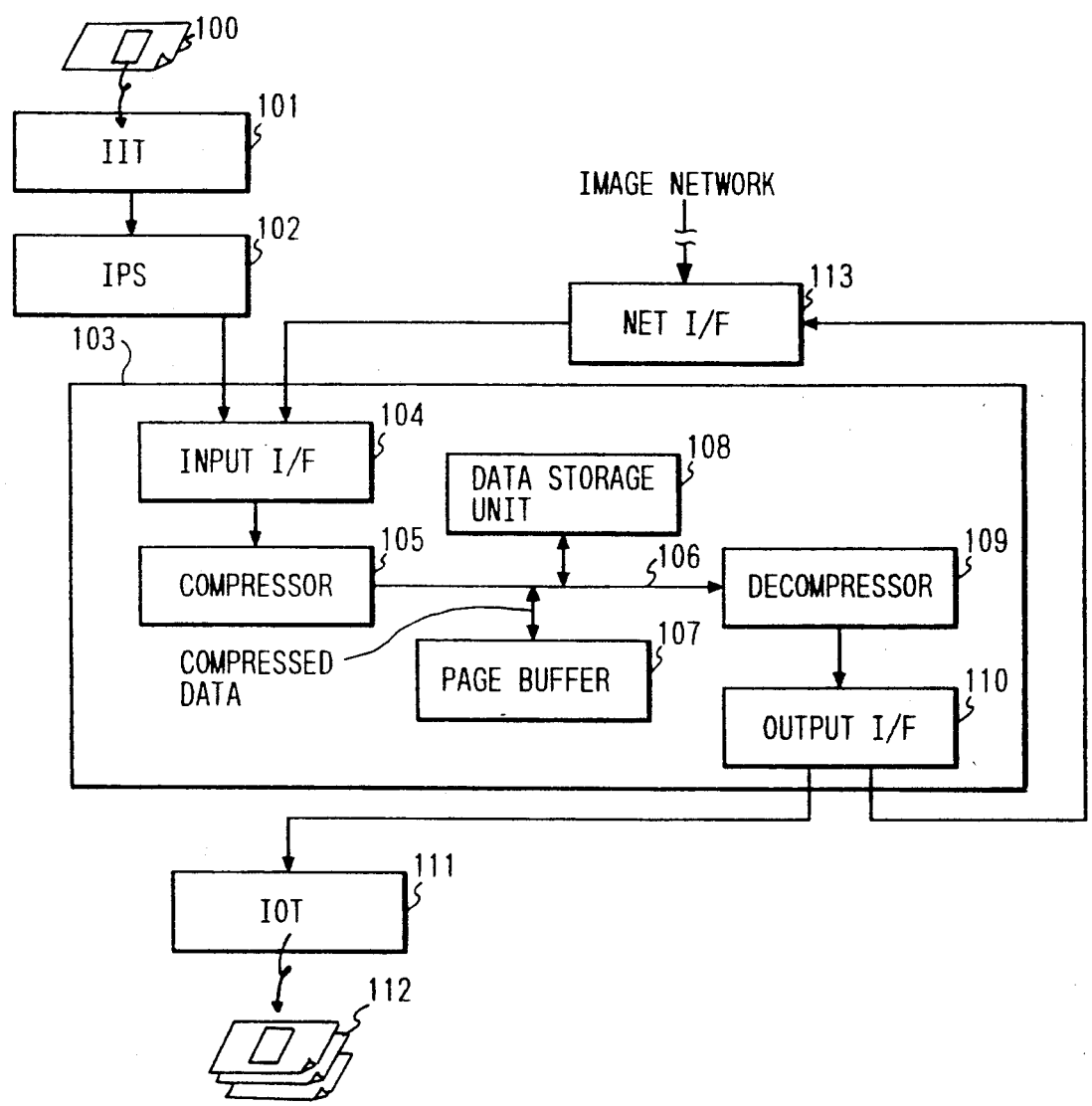
FIG. 1 is a block diagram showing an image processing system in which a data compressing method according the preferred embodiment of the present invention is applied.

FIG. 1 is a block diagram showing an image processing system in which a data compressing method according to the present invention is applied. FIG. 1 shows a document 100, an image input terminal (IIT) 101, an image data processing unit (IPS) 102, a compandor (compressor/expandor) section 103, an input interface (I/F) 104, a data compressor unit 105, a transmission line 106, a page buffer 107, an image data storage unit 108, an expander or decompressor unit 109, an output interface (I/F) 110, an image output terminal (IOT) 111, a copy/print output unit 112, and a network interface (I/F) 113.

Image data obtained by scanning the surface of document 100 by IIT 101 is processed by the IPS 102, and is transferred to compandor unit 103, through input I/F 104. Image data generated by I/F 104 is compressed by compressor unit 105, as will be described in detail later. Each page of the compressed data is either stored into page buffer 107 or is directly transferred to decompressor unit 109 where it is decompressed. The decompressed image data is transferred through output I/F 110 to IOT 111. The image data is also transferred to an image network, through output I/F 110 and network I/F 113. The image processing system is capable of receiving image data from the image network for compression, decompression, and reproduction. Further, the image data as compressed by compressor unit 105 is stored into image data storage unit 108 and may be output at a later time.

FIG. 2 shows compressor unit 105 in series with decompressor unit 109. In compressor unit 105, input data is first processed by predictors 120. The output of predictor 120 will tend to have longer runs of "0" than the input of predictor unit 120.

Each Predictor unit 120 contains 15 predictors of 4 different types. The first type of the predictor is a bit-above predictor shown in FIG. 3(a). The bit-above predictor predicts a value of a bit P by referring to a value of a bit X located at the corresponding horizontal position in the previous line.

The second type of the predictor is a pre-bit predictor shown in FIG. 3(b). The pre-bit predictor predicts a value of a bit P by referring to a value of a bit X immediately preceding bit P.

The third type of the predictor is a font (five elements) predictor shown in FIG. 3(c). The font predictor predicts a value of a bit P on the basis of the statistical result of states of five reference bits X1, X2, X3, X4 and X5.

The fourth type of predictor is of the halftone type. There are 12 halftone type predictors. Each of the 12 halftone predictors uses a reference bit preceding predictive bit P by 5 to 16 bits respectively, as generally shown in FIG. 3(d).

In order to implement each of the predictor rules described above, each predictor unit 120 contains a memory to enable it to refer to the 16 bits preceding the predictive bit, and to the bits of the previous line.

The prediction process adapts to changes in the input data. The adaptive prediction process operates as follows. For the selection of one of the predictors, a predictor priority order is initialized at the beginning of each line. The priority order at the beginning of a line is as follows:

(1) 5 element predictor
(2) bit-above predictor
(3) pre-bit predictor
(4) halftone predictor of the shortest pattern length After priority order initialization, the predictors are selected in the following way. If the previous pixel was predicted with no error, the predictor used to predict the previous pixel is used for the current pixel. If the predictor used for the previous pixel produced an error, the predictor that produces the least amount of error for the previous pixel is selected among from the predictors in the priority order of (1) to (4). In case where the predictor previously used produces an error and the other predictors are successively selected and used in the priority order and each produces an error equal to that of the previously used predictor, the previously used predictor is used for the current pixel.

Predictor unit 120 receives 8-bit data, and produces error data every four bits.

FIG. 4 is a diagram for explaining error data generated by each predictor unit 120. As shown, the predictor unit 120 sequentially receives 8-bit data. Then, in the predictor unit, a predictor is selected in accordance with the rules described earlier. Predictor unit 120 produces error data every four bits (nibble). When an error is "0", the error data is a "0" nibble (0000). When an error occurs, the bit of the error is set to "1", and the error data might be (0100), for example.

Encoders 121 encode the data generated by predictor units 120. There is an encoder/predictor pair for each of the 4 pixel bit positions, as will be discussed later. The data generated by predictor 120 will consist of runs of "0" nibbles interspersed with nonzero nibbles. Encoder 121 encodes the runs of "0" nibbles with a run-length and a terminator code. A terminator code is selected based on the bit pattern of the first nonzero nibble after a run of "0" nibbles. In other words, terminator codes are selected depending on the types of the error data.

FIG. 5 is a chart associating types of error data with a terminator code. In the case of the error data containing a single error bit, such as 0001, 0010, 0100, and 1000, the terminator code is TA. In the case of error data containing multiple error bits, the terminator code is TB.

For the terminator code TA, the error data is encoded tttt→aa; 0001→00, 0010→01, 0100→10, and 1000→11 (see FIG. 6(a)).

FIG. 6(b) shows that in the case of the terminator code TB, the error data is encoded rrrr→bb; 0011→0100, 0101→0101, 0110→0110, 0111→0111, 1001→1001, 1010→1010, 1011→1011, 1100→110, 1101→1101, 1110→1110, and 1111→1111 (see FIG. 6(b))

FIG. 7 shows the encoding of a run of the "0" nibbles in accordance with the run-length and the terminator codes case by case. Consider a case where a run-length of "0" is delineated by error data containing a single error bit (terminator code TA). In this case, the run-length of 0 is expressed by 10aa Run-lengths of 1 to 25 are designated by 0rrr rraa, 26 to 63 by 11rr rrr ttt, and 64 to 89 by 11ss ssss tttt. The codes rrrrr and rrrrrr denote a binary expression of the run-length. The code ssssss denotes a binary expression of the result of subtraction of 64 from the run-length.

In the case of the terminator code TB for the error data containing a plurality of error bits, the run-length of 0 or 1 is expressed by 011b bbbr. The run-lengths of 2 to 63, by 11rr rrrr tttt. Here, tttt is encoded by bbbb shown in FIG. 6.

Run-lengths too long to be encoded by the scheme shown in FIGS. 7 and 8 are encoded in the form of a multiple of 64 number of 0 nibbles. FIG. 9 shows the encoding of long run-lengths as 11rr rrrr 0000 where rrrrrr is a binary value obtained by dividing the run-length by 64. Run-lengths that are multiples of 64 in the range 64 to 4032 are encoded in this manner.

FIG. 10 is a table showing line boundary codes and their corresponding meaning as interpreted by compressor 105. Code "00" indicates an RAW mode for which compressor 105 does not compress the data, but instead merely transfers the data to the output of compressor 105. Code "01" indicates a NOR mode for which compressor 105 compresses the input data using prediction followed by run-length encoding. Code "10" indicates PBK meaning that it is assumed that the lines are all "0's" in the prediction. Code "11" indicates RPT meaning that the previous line is repeated.

FIG. 11 shows an example of the processing of encoder 121. FIG. 11(a) is a series of bits applied to encoder 121 and FIG. 11(b) is the encoded version of the bit series of FIG. 11(a) generated by encoder 121.

In FIG. 11(b), "0000 0001" on the first line indicates a normal mode in which input data is predicted and then encoded. "0000 0001" is used for distinguishing the case of no prediction and no coding. The second line encodes the 8 nibbles of successive "0's" from the beginning up to non-zero nibble containing "0001". The terminator code is TA, because the non-zero nibble contains a single error bit. Because the run-length is 8, this case corresponds to the second line of the table in FIG. 7, covering run-lengths between 1 and 25. Thus, "0" is the first digit of the code. Next, the run-length of 8 is expressed by "1000" followed by the terminator "0001", because the code is 11 in the column of "aa" (see FIG. 6(a)) As a result, an 8-bit binary code of "0010 0011" of the second line is formed.

The third line represents the run-length of the bit series from the second half of the fifth byte delineated by the 1111 in the first half of the sixth byte. Because the terminator is 1111 (TB), this case corresponds to the second line of the table of FIG. 8 where the run-length is 0-1, and "011" will appear in the code. "bbbb" representative of the terminator corresponds to "1111", and hence is "1111" (see FIG. 6(b)) Finally, "1" representative of the run-length appears in the code. Consequently, a code "0111 1111" is formed. The fourth line represents the start of the next line of encoded input image data.

The error data encoded by encoder 121 is transferred through a transmission line to a decoder 123 where it is decoded. An inverse predictor 124 converts the decoded error data to the image data in accordance with the predictor used.

No code is inserted in the compressed data to indicate which predictor was applied by predictor unit 120. Inverse predictor 124 can determine the predictor used by predictor unit 120 because inverse predictor 124 contains the same predictor selection rules as predictor 120, and because the predictor selected for the current pixel is based on the predictor that would have worked best on the previous pixel. Thus, inverse predictor 124 has the same information available for selecting a predictor as predictor unit 120.

The data compressing system of the present invention will be described. In the description, it is assumed that raster data is serially input to compandor 103.

Generally, image data is compressed one line at a time. When a detecting means detects that a line of image data contains all "0's" a special line boundary code is inserted into the image data to indicate that the line of image data is all "0's". Compressor 105 contains means for detecting the special line boundary code, and when compressor 105 detects the special line boundary code compressor 105 simply transfers the special line boundary code to its output but does not transfer the line of "0's" to its output. Decompressor 109 also contains means for detecting the special line boundary code, and when compressor 109 detects the special line boundary code compressor 109 generates a line of all "0's". In this way the compression efficiency for image data containing frequent lines of all "0's", such as text image data, is enhanced.

The data compression system according to the preferred embodiment will now be described in detail.

Input I/F 104 shown in FIG. 1, which serially receives raster data from IPS 102, contains a memory storing the image data, and detects when a line of the serial data as input are all "0's". If the one-line data is all "0's", the I/F 104 adds a special line boundary code to the data.

When image data as shown in FIG. 12(a) is serially input to I/F 104 (FIG. 1), I/F 104 stores the image data into the line memory contained therein line by line, as shown in FIG. 12(b). At the same time, in I/F 104, an 8-bit serial-to-parallel converter 130 contained therein converts 8-bit serial data into 8-bit parallel data, as shown in FIG. 13.

Figure 14:
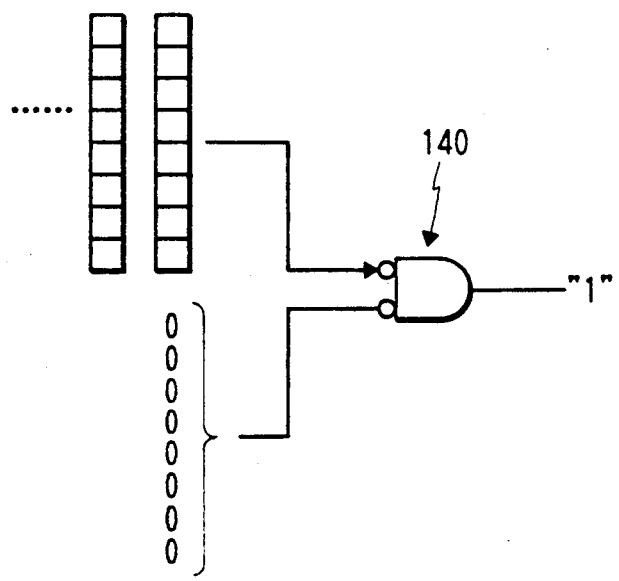
FIG. 14 is a diagram illustrating the detection of line data of all "0's".

FIG. 14 is a sketch of circuitry constituting a means for detecting a line of all "0's". 8-bit parallel data from serial-parallel converter 130 is applied to OR gate 1410. Any bits in the 8-bit parallel data being nonzero will result in a "1" being applied to OR gate 1420, and the next clock pulse will clock a "1" into D flip-flop 1430. The feedback path from the Q output of D flip-flop 1430 to OR gate 1420 ensures that once D flip-flop 1430 is set during the course of processing a line, D flip-flop 1430 will remain set. All of the data for a line is applied to OR gate 1410 in the form of multiple portions of 8-bit parallel data. After a line containing all "0" has been processed, D flip-flop 1430 will not be set and the output of inverter 1440 will be a "1".

Figure 15:
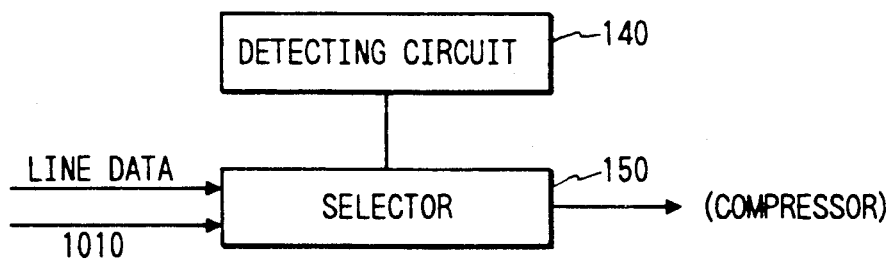
FIG. 15 is a block diagram showing a circuit for inserting the special line boundary code into the image data.

As shown in FIG. 15, the output data signal of all "0" line detecting circuit 140 is applied to the control input of a selector 150. Selector 150 receives line data on one data input and the special line boundary code "1010" on the other data input. When the output of the detecting circuit 140 is "0", selector 150 selects line data, and outputs it as it is. When the output of detecting circuit 140 is "1", selector 150 selects the special line boundary code "1010" of FIG. 17(a) as a line boundary code. The special line boundary code may be any value other than the value of any other line boundary code.

Figure 16:
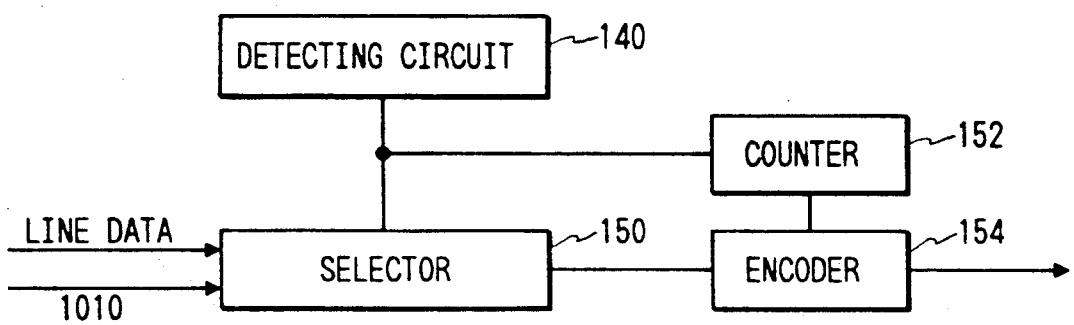
FIG. 16 is a block diagram showing a circuit for inserting ht special line boundary code and a code to indicate a number of blank lines into the image data.

FIG. 16 is a block diagram of a circuit for processing multiple adjacent blank lines. Detecting circuit 140 generates an output signal indicating the detection of a set of adjacent blank lines. Selector 150 is used to insert the special line boundary code into the image data. Selector 150 has a control input connected to detecting circuit 140, a first data input coupled to a line of input image data, and a second data input coupled to the special code. When detecting circuit 140 detects a set of adjacent blank lines, selector 150 generates a serial output containing the special line boundary code, followed by a 4-bit field allocated for representing the number of adjacent blank lines, followed by the image data.

In FIG. 16 a counter 152 counts the number of successive all "0" lines. Counter 152 counts the number of lines for which the output of detecting circuit 140 is "1" and generates an output for an encoder 154. Encoder 154 writes a number to indicate the number of successive all "0" lines into the 4-bit field following the special line boundary code "1010" generated by selector 150. Encoder 154 could write $N-1$ into the 4-bit field, thereby indicating 1-16 adjacent blank lines. Counter 152 is reset when the output detecting circuit 140 being is "0" at the end of processing of a line.

Thus, the image data along with the special line boundary code of "1010", and a number indicating a number of successive all "0" lines, is applied to compressor 105.

Compressor 105 contains a line boundary code detector as shown in FIG. 18. Output bits A2 and A4 of a shift register 160 are directly applied to an AND gate 170. Output bits A1 and A3 are applied to AND gate 170 through inverts 164 and 166 respectively. Thus, AND gate 170 will generate a "1" output if and only if shift register 160 contains the special line boundary code "1010".

When compressor 105 detects the special boundary code, compressor 105 generates an output consisting of a special boundary code and the 4-bits indicating the number of successive all "0" lines. When compressor 105 detects the special line boundary code, compressor 105 does not attempt to compress the input data, and compressor 105 does not transfer the image input data to the output of compressor 105. Thus, when an all "0" line is detected, compressor 105 does not perform the processing to select a predictor as discussed above. When compressor 105 does not detect the special line boundary code the image data is compressed in accordance with the adoptive prediction followed by encoding technique discussed above.

When decompressor 109 detects the special line boundary code, decompressor 109 generates a number of all "0" lines in accordance with the 4-bits following the special line boundary code indicating the number of successive all "0" lines. Thus, decompressor 109, as well as compressor 105, foregoes the normal processing involved with selecting a predictor when an all "0" line is detected.

Text image data tends to contain all white lines between lines of text. The all white lines tend to be adjacent and occur frequently. With the data compression system according to the preferred embodiment of the present invention, when an all white line is detected a compressor generates a code indicating the all white line and neither compresses nor generates the input image data as an output. Thus, the compression efficiency of a system for processing image data is enhanced and processing time is economized.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. A data compression system for an image processing system comprising:
   means for receiving a line of image data;
   means, responsive to the receiving means, for storing the line of image data;
   means, responsive to the receiving means, for detecting a blank line of image data;
   means, responsive to the storing means and to the blank line detecting means, for inserting a special code into the image data each time the detecting means detects a blank line of image data, the inserting means including
   selecting means including
   a control input coupled to the means for detecting a blank line of image data;
   a first data input coupled to the storing means;
   a second data input for receiving the special code; and
   means, responsive to the control input, for generating an output containing the special code and the blank line of image data, each time the means for detecting a blank line detects a blank line; and
   compressing means, responsive to the means for inserting, including
   means for detecting the special code,
   means for generating a compressed version of the image data, when the special code detecting means does not detect the special code, and
   means for transmitting a code representing the special code, when the special code detecting means detects the special code.

2. The system of claim 1, wherein the compressing means includes
   means for compressing in accordance with an adaptive compression system.

3. The system of claim 1, wherein the compressing means includes
   means for adaptively predicting image data to produce predicted image data; and
   means, coupled to the predicting means, for encoding the predicted image data.

4. A data compression system for an image processing system comprising:
   means for receiving a line of image data;
   means, responsive to the receiving means, for storing the line of image data;
   means, responsive to the receiving means, for detecting a set of N adjacent blank lines of image data, including
   means for generating an output signal indicating the detection of a set of N adjacent blank lines, and
   means, coupled to the means for generating an output indicating the detection of a set of N adjacent blank lines, for generating an output signal indicating the number N;
   means, responsive to the storing means and to the blank lines detecting means, for inserting a special code and a code representing N into the input image data when the detecting means detects a set of N adjacent lines of blank image data, the inserting means including
   selecting means including
   a control input, coupled to the means for generating an output indicating the detection of a set of N adjacent lines;
   a first data input coupled to the storing means;

a second data input for receiving the special code;

means, responsive to the control input, for generating an output containing the special code, a field allocated for representing N, and a blank line of image data each time the means for detecting a set of adjacent blank lines detects a set of adjacent blank lines; and means, coupled to the means for generating an output indicating N, for writing a code indicating N into the field allocated for representing N; and compressing means, responsive to the means for inserting, including means for detecting the special code;

means for generating a compressed version of the image data, when the means for detecting the special code does not detect the special code; and means for transmitting a code representing the special code and the code representing N, when the means for detecting the special code detects the special code.

5. The system of claim 4, wherein the compressing means includes means for compressing in accordance with an adaptive compression system.

6. The system of claim 4, wherein the compressing means includes means for adaptively predicting image data to produce predicted image data; and means, coupled to the predicting means, for encoding the predicted image data.

7. A data compression method for an image processing system comprising the steps of:

receiving a line of image data;

storing, responsive to the receiving step, the line of image data;

detecting, responsive to the receiving step, a blank line of image data;

inserting, in response to the blank line detecting step, a special code into the image data each time the detecting step detects a blank line of image data, including the substeps of selecting a line of image data, selecting the special code, and generating an output containing the special code and the line of image data, when the detecting a blank line detects a blank line; and compressing the image data, responsive to the inserting step, including the substeps of detecting the special code, generating a compressed version of the image data, when the special code detecting step does not detect the special code, and otherwise, transmitting a code representing the special code.

8. The method of claim 7, wherein the compressing step includes the substep of compressing in accordance with an adaptive compression system.

9. The method of claim 7, wherein the compressing step includes the substeps of adaptively predicting image data to produce predicted image data; and encoding the predicted image data.

10. A data compression method for an image processing system comprising:

receiving a line of image data;

storing, responsive to the receiving step, the line of image data;

detecting, responsive to the receiving step, a set of N adjacent blank lines of image data, including the substeps of generating an output signal indicating the detection of a set of N adjacent blank lines, and generating an output signal indicating the number N;

inserting, in response to the blank lines detecting step, a special code and a code representing N into the image data when the detecting step detects a set of N adjacent lines of blank image data, including the substeps of selecting a line of image data, selecting the special code, generating an output containing the special code, a field allocated for representing N, and the line of image data, when the step of detecting a set of adjacent blank lines detects a set of adjacent blank lines, and writing a code indicating N into the field allocated for representing N; and compressing the image data, in response to the inserting step, including the substeps of detecting the special code, generating a compressed version of the image data, when the step of detecting a special code does not detect the special code, and otherwise, transmitting a code representing the special code and the code representing N.

11. The method of claim 10, wherein the compressing step includes the substep of compressing in accordance with an adaptive compression system.

12. The method of claim 10, wherein the compressing step includes the substeps of adaptively predicting image data to produce predicted image data; and encoding the predicted image data.

13. A data compression system for an image processing system comprising:

means for receiving a line of image data;

means, responsive to the receiving means, for storing the line of image data;

means, responsive to the receiving means, for detecting a set of N adjacent blank lines of image data, the detecting means including means for generating an output signal indicated the detection of a set of N adjacent blank lines, and means, coupled to the means for generating an output indicating the detection of a set of N adjacent blank lines, for generating an output signal indicating the number N;

means, responsive to the storing means and to the blank lines detecting means, for inserting a special code and a code representing N, N being at least 3, into the input image data when the detecting means detects a set of N adjacent lines of blank image data, the inserting means including selecting means including a control input, coupled to the means for generating an output indicating the detection of a set of N adjacent lines, a first data input coupled to the storing means, a second data input for receiving the special code, means, responsive to the control input, for generating an output containing the special code, a field allocated for representing N, and a blank line of image data each time the means for detecting a set of adjacent blank lines detects a set of adjacent blank lines, and means, coupled to the means for generating an output indicating N, for writing a code indicating N into the field allocated for representing N; and compressing means, responsive to the means for inserting, including means for detecting the special code;

means for generating a compressed version of the image data, when the means for detecting the special code does not detect the special code; and means for transmitting a code representing the special code and the code representing N, when the means for detecting the special code detects the special code.

14. The system of claim 13, wherein the compressing means includes means for compressing in accordance with an adaptive compression system.

15. The system of claim 13, wherein the compressing means includes means for adaptively predicting image data to produce predicted image data; and means, coupled to the predicting means, for encoding the predicted image data.

* * * * *

UNITED STATES PATENT AND TRADEMARK OFFICE
CERTIFICATE OF CORRECTION

PATENT NO. : 5,185,820
DATED : February 09, 1993
INVENTOR(S) : Masahiko Miyata

It is certified that error appears in the above-identified patent and that said Letters Patent is hereby corrected as shown below:

Abstract, title page, line 3, change "all white" to --blank--.

Abstract, title page, line 5, change "all white" to --blank--.

Claim 13, column 10, line 50, change "indicated" to --indicating--.

Signed and Sealed this

Eighth Day of March, 1994

Attest:

BRUCE LEHMAN

Attesting Officer

Commissioner of Patents and Trademarks